(12) United States Patent
Chen et al.

(10) Patent No.: US 9,546,095 B2
(45) Date of Patent: Jan. 17, 2017

(54) PREPARATION PROCESS OF TRANSITION METAL BORIDE AND USES THEREOF

(71) Applicant: SHENZHEN SUNXING LIGHT ALLOYS MATERIALS CO., LTD, Baoan District, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/160,661

(22) Filed: Jan. 22, 2014

(65) Prior Publication Data

US 2014/0134090 A1     May 15, 2014

Related U.S. Application Data

(62) Division of application No. 13/709,025, filed on Dec. 9, 2012, now Pat. No. 8,709,368.

(30) Foreign Application Priority Data

May 30, 2012   (CN) .......................... 2012 1 0172846

(51) Int. Cl.
| | | |
|---|---|---|
| *C01B 31/04* | (2006.01) | |
| *C25C 3/12* | (2006.01) | |
| *C01B 35/04* | (2006.01) | |

(52) U.S. Cl.
CPC ......... *C01B 35/04* (2013.01); *C25C 3/12* (2013.01)

(58) Field of Classification Search
None
See application file for complete search history.

(56) References Cited

U.S. PATENT DOCUMENTS

| | | | | |
|---|---|---|---|---|
| 4,111,765 A | * | 9/1978 | De Nora | ........... C04B 35/58064 204/196.38 |
| 5,057,150 A | * | 10/1991 | Reeve et al. | .................... 75/671 |

OTHER PUBLICATIONS

Jensen et al.; J. Am. Chem. Soc. 110, pp. 1643-1644; 1988.*

* cited by examiner

*Primary Examiner* — Guinever S Gregorio
(74) *Attorney, Agent, or Firm* — Jackson IPG PLLC; Demian K. Jackson

(57) ABSTRACT

The invention provides a preparation process of transition metal boride, comprising the following steps: A) aluminum is put in a reactor, inert gas is fed into the reactor after evacuation, the reactor is heated up to 700 to 800° C. and then added with dry potassium fluoborate or sodium fluoborate, monomer boron and cryolite are generated by rapid stirring and reaction for 4 to 6 hours, and the molten liquid at the upper layer is sucked out and the monomer boron is obtained by means of separation; and B) the obtained monomer boron is added with transition metal for reaction at the temperature from 1800 to 2200° C. in order to generate corresponding transition metal boride.

6 Claims, No Drawings

PREPARATION PROCESS OF TRANSITION METAL BORIDE AND USES THEREOF

TECHNICAL FIELD OF THE INVENTION

The invention relates to transition metal borides, more particularly to a preparation process of transition metal boride and uses thereof.

BACKGROUND OF THE INVENTION

The traditional Hall-Heroult method has still been employed in aluminum electrolysis industry so far, cryolite-alumina has served as the basic system for electrolyte all the time, and the existing electrolytic cell with pre-baked anode mainly adopts carbon cathode. Carbon cathode is not wet for aluminum liquid and is under the corrosion of cryolite for a long time, so in order to prolong the service life of electrolytic cell, an inert coating typically needs to be coated on the surface of carbon cathode. Due to excellent wettability for aluminum liquid and superior corrosion resistance to cryolite, transition metal borides are quite suitable for the use as carbon cathode surface coating. Meanwhile, transition metal borides can be used for preparing inert anode material owing to their excellent wettability for aluminum liquid, superior corrosion resistance to cryolite and good conductivity and thermal impact resistance. Transition metal borides like titanium boride are quite high in price, so it is difficult to implement their wide use in preparing carbon cathode surface coating material and inert anode material at present.

The current transition metal borides is mainly derived from direct reaction between titanium, zirconium, chromium or vanadium and monomer boron at high temperature. Since the yield of monomer boron in industrial production is not high (typically below 90%) and the production cost is high, expensive monomer boron results in expensive transition metal boride, further limiting large-scale industrial production of transition metal boride.

SUMMARY OF THE INVENTION

In order to solve the technical problems in the prior art, the inventor has made tremendous researches on preparation for transition metal boride and production raw materials thereof and has unexpectedly found that, the method in which monomer boron is prepared from raw material, i.e. potassium fluoborate or sodium fluoborate, by means of thermochemical reduction and corresponding transition metal boride is prepared from raw materials, i.e. monomer boron and transition metal, has the advantages of simple preparation process, high product yield and good product performances, therefore, the comprehensive production cost of transition metal boride is lowered.

The invention provides a preparation process of transition metal boride, comprising the following steps:

A) aluminum is put in a reactor, inert gas is fed into the reactor after evacuation, the reactor is heated up to 700 to 800° C. and then added with dry potassium fluoborate or sodium fluoborate, monomer boron and cryolite are generated by rapid stirring and reaction for 4 to 6 hours, and the molten liquid at the upper layer is sucked out and the monomer boron is obtained by means of separation; the chemical reaction formulas involved are as follows: $KBF_4+Al=B+KF.AlF_3$ and $NaBF_4+Al=B+NaF.AlF_3$; and B) the obtained monomer boron is added with transition metal for reaction at the temperature from 1800 to 2500° C. for 0.5 to 2 hours in order to generate corresponding transition metal boride.

With the technical proposal above, the preparation process of transition metal boride provided by the invention has the advantages of simple process, short reaction period, high product yield and good product performances, therefore, the comprehensive production cost of transition metal boride is lowered and large-scale industrial production is implementable.

As a further improvement of the invention, the transition metal is selected from titanium, zirconium, chromium or vanadium, and the chemical reaction formulas involved are as follows: $Ti+2B=TiB_2$, $Zr+2B=ZrB_2$, $Cr+2B=CrB_2$ and $V+2B=VB_2$.

As a further improvement of the invention, the inert gas is argon.

The invention further provides the use of the transition metal boride prepared by the preparation process of transition metal boride in preparing cathode coating of electrolytic cell with pre-baked anode. The transition metal boride (including titanium boride, zirconium boride, chromium boride or vanadium boride) prepared according to the invention has good conductivity and mechanical strength, excellent wettability for aluminum liquid and superior corrosion resistance to cryolite; in addition, the obtained titanium boride and carbon material are fused, then tamped onto the surface of carbon cathode and finally sintered to form inert cathode coating material for aluminum electrolysis.

The invention further provides the use of the transition metal boride prepared by the preparation process of transition metal boride in preparing inert anode material of electrolytic cell with pre-baked anode. The transition metal boride prepared according to the invention has the advantages of good conductivity, strong corrosion and impact resistances and the like; in addition, the obtained titanium boride and carbon material are uniformly mixed, then molded under high pressure and finally sintered at high temperature to form inert anode material for aluminum electrolysis.

Compared with the prior art, the invention has the advantages that: the preparation process of transition metal boride provided by the invention is simple in preparation, short in reaction period, capable of improving the production efficiency and yield of monomer boron, good in product performances, lower in the comprehensive production cost of transition metal boride, excellent in economic benefit and implementable in large-scale industrial production; The transition metal boride prepared according to the invention has excellent wettability for aluminum liquid and superior corrosion resistance to cryolite, and can be widely applied to preparing carbon cathode surface coating and inert anode material of electrolytic cell with pre-baked anode.

DETAILED DESCRIPTION OF THE EMBODIMENTS

Further detailed description is made below to the invention with reference to the embodiments.

Embodiment 1

2 tons of aluminum is put in a reactor, inert gas is fed into the reactor for the purpose of protection after evacuation, the reactor is heated up to 750° C. and then added with dry potassium fluoborate according to reaction proportion, monomer boron and cryolite are generated by rapid stirring and reaction for 5 hours, monomer boron is obtained by means of separation according to the current conventional separation method, the monomer boron is 0.78 tons according to weighing after being dried, and the yield is above 95%; the obtained monomer boron is put in another reactor, the reactor is added with titanium powder according to reaction proportion and then heated up to 2000° C., and complete reaction is achieved 1 hour later so as to generate titanium boride.

Embodiment 2

2 tons of aluminum is put in a reactor, inert gas is fed into the reactor for the purpose of protection after evacuation, the reactor is heated up to 750° C. and then added with dry sodium fluoborate according to reaction proportion, monomer boron and cryolite are generated by rapid stirring and reaction for 5 hours, monomer boron is obtained by means of separation according to the current conventional separation method, the monomer boron is 0.79 tons according to weighing after being dried, and the yield is above 95%; the obtained monomer boron is put in another reactor, the reactor is added with titanium powder according to reaction proportion and then heated up to 2000° C., and complete reaction is achieved 1 hour later so as to generate titanium boride.

Embodiment 3

2 tons of aluminum is put in a reactor, inert gas is fed into the reactor for the purpose of protection after evacuation, the reactor is heated up to 750° C. and then added with dry sodium fluoborate according to reaction proportion, monomer boron and cryolite are generated by rapid stirring and reaction for 5 hours, monomer boron is obtained by means of separation according to the current conventional separation method, the monomer boron is 0.79 tons according to weighing after being dried, and the yield is above 95%; the obtained monomer boron is put in another reactor, the reactor is added with zirconium powder according to reaction proportion and then heated up to 2100° C., and complete reaction is achieved 1 hour later so as to generate zirconium boride.

Embodiment 4

2 tons of aluminum is put in a reactor, inert gas is fed into the reactor for the purpose of protection after evacuation, the reactor is heated up to 750° C. and then added with dry sodium fluoborate according to reaction proportion, monomer boron and cryolite are generated by rapid stirring and reaction for 5 hours, monomer boron is obtained by means of separation according to the current conventional separation method, the monomer boron is 0.79 tons according to weighing after being dried, and the yield is above 95%; the obtained monomer boron is put in another reactor, the reactor is added with chromium powder according to reaction proportion and then heated up to 2000° C., and complete reaction is achieved 1 hour later so as to generate chromium boride.

Embodiment 5

2 tons of aluminum is put in a reactor, inert gas is fed into the reactor for the purpose of protection after evacuation, the reactor is heated up to 750° C. and then added with dry sodium fluoborate according to reaction proportion, monomer boron and cryolite are generated by rapid stirring and reaction for 5 hours, monomer boron is obtained by means of separation according to the current conventional separation method, the monomer boron is 0.79 tons according to weighing after being dried, and the yield is above 95%; the obtained monomer boron is put in another reactor, the reactor is added with vanadium powder according to reaction proportion and then heated up to 2000° C., and complete reaction is achieved 1 hour later so as to generate vanadium boride.

The contents discussed above are merely for further detailed description of the invention with reference to the preferred embodiments, and it shall not be considered that the embodiments of the invention are limited to the description only. Many simple deductions or substitutions could be made without departing from the concept of the invention by ordinary skilled in the art to which the invention pertains, and shall be contemplated as being within the scope of the invention.

What is claimed is:
1. A method of preparing transition metal boride comprising the following steps:
   A) aluminum is put in a first reactor, an inert gas is fed into the reactor after evacuation, the reactor is heated up to 700 to 800° C. and then added with dry potassium fluoborate or sodium fluoborate, such that monomer boron and cryolite are generated by rapid stirring and reaction for 4 to 6 hours, and the monomer boron is obtained by means of separation; and
   B) the obtained monomer boron is added with transition metal to a second reactor for reaction at the temperature from 1800 to 2200° C. in order to generate corresponding transition metal boride, the method further comprising
      fusing the obtained transition metal boride with a carbon material;
      then tamping the fused obtained transition metal boride and the carbon material onto a surface of a carbon cathode; and
      finally sintering the obtained transition metal boride and the carbon material on the carbon cathode so as to form inert cathode coating material.
2. The method of claim 1, wherein the transition metal is selected from titanium, zirconium, chromium or vanadium.
3. The method of claim 2, wherein the transition metal is chromium.
4. The method of claim 1, wherein the inert gas is argon.
5. The method of claim 1, wherein the reaction in the second reactor is conducted for 1 hour.
6. A method of preparing transition metal boride comprising the following steps:
   A) aluminum is put in a first reactor, an inert gas is fed into the reactor after evacuation, the reactor is heated up to 700 to 800° C. and then added with dry potassium fluoborate or sodium fluoborate, such that monomer boron and cryolite are generated by rapid stirring and reaction for 4 to 6 hours, and the monomer boron is obtained by means of separation; and
   B) the obtained monomer boron is added with transition metal to a second reactor for reaction at the temperature from 1800 to 2200° C. in order to generate corresponding transition metal boride, the method further comprising
      uniformly mixing the obtained transition metal boride and a carbon material;
      molding the uniformly mixed obtained transition metal boride and the carbon material under high pressure; and sintering the molded obtained transition metal boride and the carbon material at high temperature so as to form inert anode material.

\* \* \* \* \*